US008534497B2

(12) United States Patent
Veltrop et al.

(10) Patent No.: US 8,534,497 B2
(45) Date of Patent: Sep. 17, 2013

(54) DISPENSING METHOD AND APPARATUS UTILIZING A SENSOR TO DETERMINE A TIME THAT A DISPENSING VALVE IS OPEN

(75) Inventors: Loren Veltrop, Chicago, IL (US); Christopher Lyons, LaGrange Park, IL (US)

(73) Assignee: Prince Castle, LLC, Carol Stream, IL (US)

( * ) Notice: Subject to any disclaimer, the term of this patent is extended or adjusted under 35 U.S.C. 154(b) by 330 days.

(21) Appl. No.: 12/885,659

(22) Filed: Sep. 20, 2010

(65) Prior Publication Data
US 2012/0067920 A1    Mar. 22, 2012

(51) Int. Cl.
*B67D 1/00*    (2006.01)
*B67D 7/08*    (2010.01)

(52) U.S. Cl.
USPC .................................. 222/1; 222/58; 222/640

(58) Field of Classification Search
USPC .................... 222/1, 55, 58, 64, 638–642, 644
See application file for complete search history.

(56) References Cited

U.S. PATENT DOCUMENTS

| | | | | |
|---|---|---|---|---|
| 3,640,430 | A | * | 2/1972 | Roberts .............................. 222/1 |
| 4,244,218 | A | * | 1/1981 | Wohrl .............................. 73/309 |
| 5,294,022 | A | * | 3/1994 | Earle ................................ 222/56 |
| 5,340,211 | A | | 8/1994 | Pratt |
| 5,816,445 | A | * | 10/1998 | Gardos et al. ...................... 222/1 |
| 5,921,440 | A | | 7/1999 | Maines |
| 5,987,971 | A | * | 11/1999 | Sahm et al. ................... 73/61.51 |
| 6,186,361 | B1 | | 2/2001 | Teetsel, III |
| 6,253,957 | B1 | | 7/2001 | Messerly et al. |
| 6,497,343 | B1 | | 12/2002 | Teetsel, III |
| 6,659,311 | B2 | | 12/2003 | Prueter |
| 6,792,966 | B2 | | 9/2004 | Harvey |
| 7,337,920 | B2 | | 3/2008 | Duck et al. |
| 2006/0134598 | A1 | * | 6/2006 | Kenney ............................. 435/3 |
| 2007/0192981 | A1 | | 8/2007 | Lawshe |
| 2007/0267446 | A1 | | 11/2007 | Pressler |
| 2008/0271928 | A1 | * | 11/2008 | Mehus et al. ...................... 177/1 |
| 2009/0250491 | A1 | | 10/2009 | Erman et al. |
| 2010/0065587 | A1 | | 3/2010 | Erman et al. |
| 2011/0073525 | A1 | * | 3/2011 | Evans ........................... 208/157 |

FOREIGN PATENT DOCUMENTS

| | | |
|---|---|---|
| WO | WO 9425354 | 11/1994 |
| WO | WO 2004037595 | 5/2004 |
| WO | WO 2005030276 | 4/2005 |
| WO | WO 2008153535 | 12/2008 |
| WO | WO 2010/038047 | 4/2010 |

OTHER PUBLICATIONS

Fluid Mechanics, Fundamentals and Applications; Yunus A. Cengal and John M. Cibal; chapter 12: Radiation Process and Properties, McGraw Hill, Higher Education, copyright 2006.

(Continued)

*Primary Examiner* — Kevin P Shaver
*Assistant Examiner* — Patrick M Buechner
(74) *Attorney, Agent, or Firm* — Joseph P. Krause

(57) ABSTRACT

Relatively small, fixed-volumes of liquid are measured and dispensed from a bulk container by empirically determining the liquid surface height and opening a dispensing valve for a time period that is calculated using a volume of liquid specified to be dispensed and the empirically-determined liquid surface height. The liquid surface height in the container is determined empirically for subsequent volumes of liquid that are dispensed. Dispensing accuracy is maintained whether the container is full or nearly empty.

12 Claims, 20 Drawing Sheets

(56) References Cited

OTHER PUBLICATIONS

Silver King®, Majestic Series Milk Dispensers specification sheet FNSKMAJ09, 2009.

Silver King® Cream Dispenser, Model SKMCD1P, equipment manual for McDonald's Corporation®, 2005.

SureShot® Dispensing Systems, Suggested Preventive Maintenance Checklist for Refrigerated Liquid Dispenser, A.C. Dispensing Equipment, Lower Sackville, Nova Scotia Canada, Sep. 2006.

* cited by examiner $$y = -0.0012x^3 + 0.0207x^2 - 0.1444x + 0.89$$

| Output from Load Cell (Volts) | Valve Open Time (seconds) |
|---|---|
| 8.65 | 0.4131 |
| 8.6 | 0.4159 |
| 8.55 | 0.4186 |
| 8.5 | 0.4212 |
| 8.45 | 0.4238 |
| 8.4 | 0.4264 |
| 8.35 | 0.4289 |
| 8.3 | 0.4314 |
| 8.25 | 0.4338 |
| 8.2 | 0.4361 |
| 8.15 | 0.4385 |
| 8.1 | 0.4408 |
| 8.05 | 0.4430 |
| 8 | 0.4452 |
| 7.95 | 0.4474 |
| 7.9 | 0.4495 |
| 7.85 | 0.4516 |
| 7.8 | 0.4536 |
| 7.75 | 0.4556 |
| 7.7 | 0.4576 |
| 7.65 | 0.4595 |
| 7.6 | 0.4614 |
| 7.55 | 0.4633 |
| 7.5 | 0.4651 |
| 7.45 | 0.4669 |
| 7.4 | 0.4687 |
| 7.35 | 0.4704 |
| 7.3 | 0.4722 |
| 7.25 | 0.4739 |
| 7.2 | 0.4755 |
| 7.15 | 0.4771 |
| 7.1 | 0.4788 |

FIG. 17A

| | |
|---|---|
| 7.05 | 0.4803 |
| 7 | 0.4819 |
| 6.95 | 0.4834 |
| 6.9 | 0.4850 |
| 6.85 | 0.4865 |
| 6.8 | 0.4879 |
| 6.75 | 0.4894 |
| 6.7 | 0.4908 |
| 6.65 | 0.4923 |
| 6.6 | 0.4937 |
| 6.55 | 0.4950 |
| 6.5 | 0.4964 |
| 6.45 | 0.4978 |
| 6.4 | 0.4991 |
| 6.35 | 0.5005 |
| 6.3 | 0.5018 |
| 6.25 | 0.5031 |
| 6.2 | 0.5044 |
| 6.15 | 0.5057 |
| 6.1 | 0.5070 |
| 6.05 | 0.5083 |
| 6 | 0.5096 |
| 5.95 | 0.5109 |
| 5.9 | 0.5122 |
| 5.85 | 0.5134 |
| 5.8 | 0.5147 |
| 5.75 | 0.5160 |
| 5.7 | 0.5172 |
| 5.65 | 0.5185 |
| 5.6 | 0.5198 |
| 5.55 | 0.5210 |
| 5.5 | 0.5223 |

FIG. 17B

| | |
|---|---|
| 7.05 | 0.4803 |
| 7 | 0.4819 |
| 6.95 | 0.4834 |
| 6.9 | 0.4850 |
| 6.85 | 0.4865 |
| 6.8 | 0.4879 |
| 6.75 | 0.4894 |
| 6.7 | 0.4908 |
| 6.65 | 0.4923 |
| 6.6 | 0.4937 |
| 6.55 | 0.4950 |
| 6.5 | 0.4964 |
| 6.45 | 0.4978 |
| 6.4 | 0.4991 |
| 6.35 | 0.5005 |
| 6.3 | 0.5018 |
| 6.25 | 0.5031 |
| 6.2 | 0.5044 |
| 6.15 | 0.5057 |
| 6.1 | 0.5070 |
| 6.05 | 0.5083 |
| 6 | 0.5096 |
| 5.95 | 0.5109 |
| 5.9 | 0.5122 |
| 5.85 | 0.5134 |
| 5.8 | 0.5147 |
| 5.75 | 0.5160 |
| 5.7 | 0.5172 |
| 5.65 | 0.5185 |
| 5.6 | 0.5198 |
| 5.55 | 0.5210 |
| 5.5 | 0.5223 |

FIG. 17C

| | |
|---|---|
| 3.8 | 0.5743 |
| 3.75 | 0.5763 |
| 3.7 | 0.5783 |
| 3.65 | 0.5804 |
| 3.6 | 0.5824 |
| 3.55 | 0.5846 |
| 3.5 | 0.5867 |
| 3.45 | 0.5889 |
| 3.4 | 0.5912 |
| 3.35 | 0.5935 |
| 3.3 | 0.5958 |
| 3.25 | 0.5982 |
| 3.2 | 0.6006 |
| 3.15 | 0.6030 |
| 3.1 | 0.6055 |
| 3.05 | 0.6081 |
| 3 | 0.6107 |
| 2.95 | 0.6134 |
| 2.9 | 0.6161 |
| 2.85 | 0.6188 |
| 2.8 | 0.6216 |
| 2.75 | 0.6245 |
| 2.7 | 0.6274 |
| 2.65 | 0.6304 |
| 2.6 | 0.6334 |
| 2.55 | 0.6365 |
| 2.5 | 0.6396 |
| 2.45 | 0.6428 |
| 2.4 | 0.6461 |
| 2.35 | 0.6494 |
| 2.3 | 0.6528 |
| 2.25 | 0.6562 |
| 2.2 | 0.6597 |
| 2.15 | 0.6633 |

FIG. 17D

| | |
|---|---|
| 2.1 | 0.6669 |
| 2.05 | 0.6706 |
| 2 | 0.6744 |
| 1.95 | 0.6782 |
| 1.9 | 0.6821 |
| 1.85 | 0.6861 |
| 1.8 | 0.6901 |
| 1.75 | 0.6943 |
| 1.7 | 0.6984 |
| 1.65 | 0.7027 |
| 1.6 | 0.7070 |
| 1.55 | 0.7114 |
| 1.5 | 0.7159 |
| 1.45 | 0.7205 |
| 1.4 | 0.7251 |
| 1.35 | 0.7298 |
| 1.3 | 0.7346 |
| 1.25 | 0.7395 |
| 1.2 | 0.7445 |
| 1.15 | 0.7495 |
| 1.1 | 0.7546 |

DISPENSING METHOD AND APPARATUS UTILIZING A SENSOR TO DETERMINE A TIME THAT A DISPENSING VALVE IS OPEN

FIELD OF THE INVENTION

This invention relates to a liquid dispenser. More particularly, this invention relates to a dispenser for dairy products, which can dispense small, fixed-volumes of liquid from a bag, tank or basin, or other container and, continue to accurately deliver specified amounts as the liquid in the container is depleted.

BACKGROUND

Many restaurants and food service providers provide coffee and other beverages into which a small volume of creamer or other liquid is added. The prior art dispensers for such liquids open a valve for a time period that is determined using an initial level of the liquid in the container. As liquid is dispensed over time, the level of the liquid in the tank drops of course, lowering the static pressure at the valve and as a result, reducing the volumetric flow rate from the tank.

Some prior art creamer dispensers are able to dispense different fixed amounts of liquid by actuating one or more push button switches on the front panel of the device. The switches send a signal to a computer or other controller, which opens an electrically-actuated dispensing valve for a time period that is supposed to allow the volume of liquid that was requested by the actuation of a push button to be dispensed from a bulk container. Such prior art dispensers require a user to accurately fill the container and specify the starting volume to a controller. The controller calculates dispensing valve open times for each dispensing using the starting or initial liquid level. Prior art devices account for the continuously-dropping static pressure by counting the number of ounces that are requested to be dispensed from the container. The number of ounces that are requested is used to decrement an initial amount of liquid in the container. The volume dispensing accuracy of prior art devices thus depends in part on the accuracy of the initial level that is provided to the controller.

A problem with liquid dispensers that count the number of dispensing actuations, or which decrement a user-specified starting amount in a container according to the number of dispensing actuations, is that their accuracy depends largely on whether the initial amount of liquid in a container was accurate. If the actual starting level in the container is not what is conveyed to the controller when the container is first installed, every subsequently dispensed volume will not be equal to the requested amount.

Another problem with prior art dispensers is that dispensing accuracy almost invariably deteriorates as the level of the liquid in a container falls with successive dispenses. Dispensing valves require a finite amount of time to open and close. Different valves can require slightly different amounts of time to open and close. The amount of liquid actually dispensed rarely matches the amount of liquid that is supposed to be dispensed. Over time, the dispensing error accumulates. As the liquid level in a container approaches zero, the amount of liquid that is actually dispensed for any specified valve open time period will almost always be different from what the dispenser counts or think was dispensed. A liquid dispenser that is able to more accurately dispense user-specified volumes without regard to an initial or starting volume and which can continue to do so as a tank empties would be an improvement over the prior art.

BRIEF DESCRIPTION OF THE DRAWINGS

FIGS. 17A-17E provide a table of valve open time in seconds as a function of load cell output in volts.

DETAILED DESCRIPTION

Figure 1:
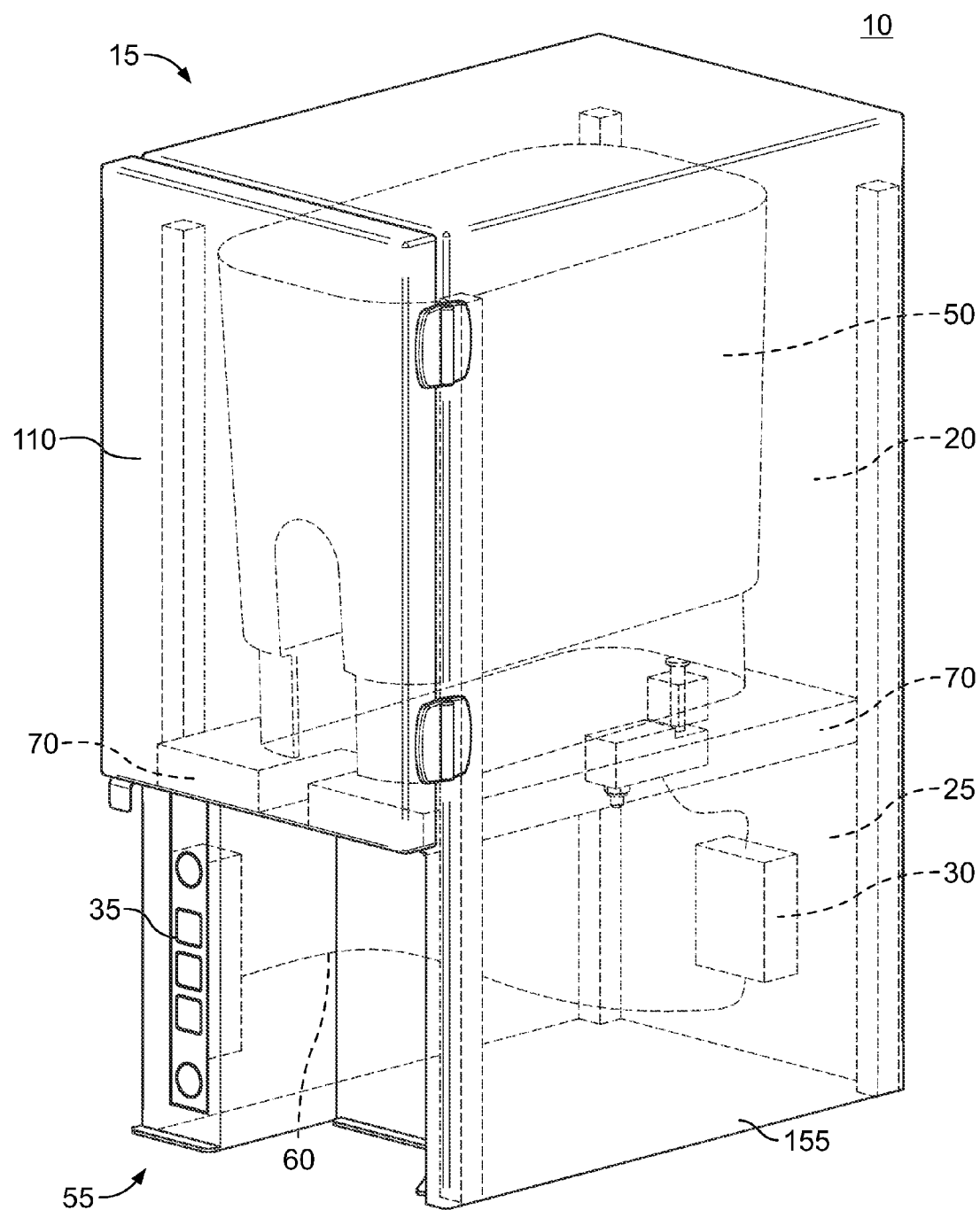
FIG. 1 is a perspective view of a dispenser of small volumes of liquids.

FIG. 1 is a perspective view of a liquid dispenser apparatus 10 for dispensing specific volumes of liquids. The liquids that can be dispensed have viscosities that vary from about 1 centipoise to about 7500 centipoise. The dispensable liquids thus include low viscosity alcohols, water, juices, moderate viscosity liquids like dairy products such as milk and cream, and viscous liquids that include oils including petroleum products and syrups. The dispensable volumes range from fractions of a liquid ounce up to volumes measured in gallons. An important feature of the apparatus is that unlike prior art dispensers, the apparatus 10 permits an operator to manually dispense any volume of liquid and immediately thereafter, resume accurately dispensing user-requested fixed volumes without losing accuracy of the dispensed volumes.

The apparatus 10 is comprised of a cabinet 15 having a refrigerated upper compartment 20 and an unrefrigerated lower compartment 25. The lower compartment 25 encloses refrigeration equipment used to keep the upper compartment cold. Refrigeration equipment is well known and omitted from the figures for clarity.

The lower compartment 25 encloses a control computer 30. The computer 30 is preferably embodied as a single-chip microcontroller with on-board memory. Such microcontrollers are well known to those of ordinary skill in the art. Many of them have electrical interfaces on the microcontroller which send and receive electrical signals to and from other circuitry and devices, not shown but which interface, i.e., electrically connect, the computer 30 to peripheral devices that include an array of push-button, operator-actuated dispensing control switches 35, a dispensing control valve 40 not visible in FIG. 1. In alternate embodiments described below, the computer 30 is coupled to various devices described below, which are used to determine the level of the liquid 45 in the tank 50.

The dispensing valve 40 is a pinch valve. The pinch valve 40 pinches off, i.e., closes, a flexible dispensing tube that extends from the container 50. The valve is explained more fully below and in the Applicant's co-pending patent application Ser. No. 12/885,641 entitled Pinch Valve, the contents of which are incorporated herein by reference in their entirety.

In the preferred embodiment, a user can select a particular volume of liquid to dispense by actuating one or more push button switches 35 affixed to the front panel 55 of the lower compartment 25. Wires 60 connect the switches 35 to the computer 30 located in the lower compartment 25. Switch closures are detected by the computer 30. Each switch requests the computer to dispense a different volume. The particular volume selected by the various switches is a design choice. In one embodiment, the software in the computer memory is written to interpret multiple switch closures, whether they are made serially or in parallel, as requests for multiple volumes. By way of example, actuation of a 1-ounce switch informs the computer 30 that one ounce is requested by a user. Actuation of a 1-ounce switch followed immediately by actuation of a 3-ounce switch, or simultaneously with the 3-ounce switch, is construed by the computer as a user-request for the delivery of four ounces.

Switch closures and electrical signals input to the computer 30 from one or more detectors/sensors described below enable the computer 30 to calculate a time required to open the dispensing valve 40 to dispense a requested volume. The valve open time is determined using a requested volume and a real-time, direct measurement of the liquid in a container 50. Except for manually-dispensed volumes, which require an operator to manually open the pinch valve, the valve open time for each requested amount of liquid to be dispensed under software control is considered herein to be determined empirically. An empirical determination is considered to be a determination that is made using sensing of the actual amount of liquid in the tank, or the actual level of the liquid in the tank, just before the liquid is actually dispensed. Unlike prior art devices, the valve open time is not determined by counting or accumulating volumes that have been previously dispensed. The valve open time required to dispense a particular volume of liquid is determined empirically prior to each opening of the pinch valve.

Figure 2:
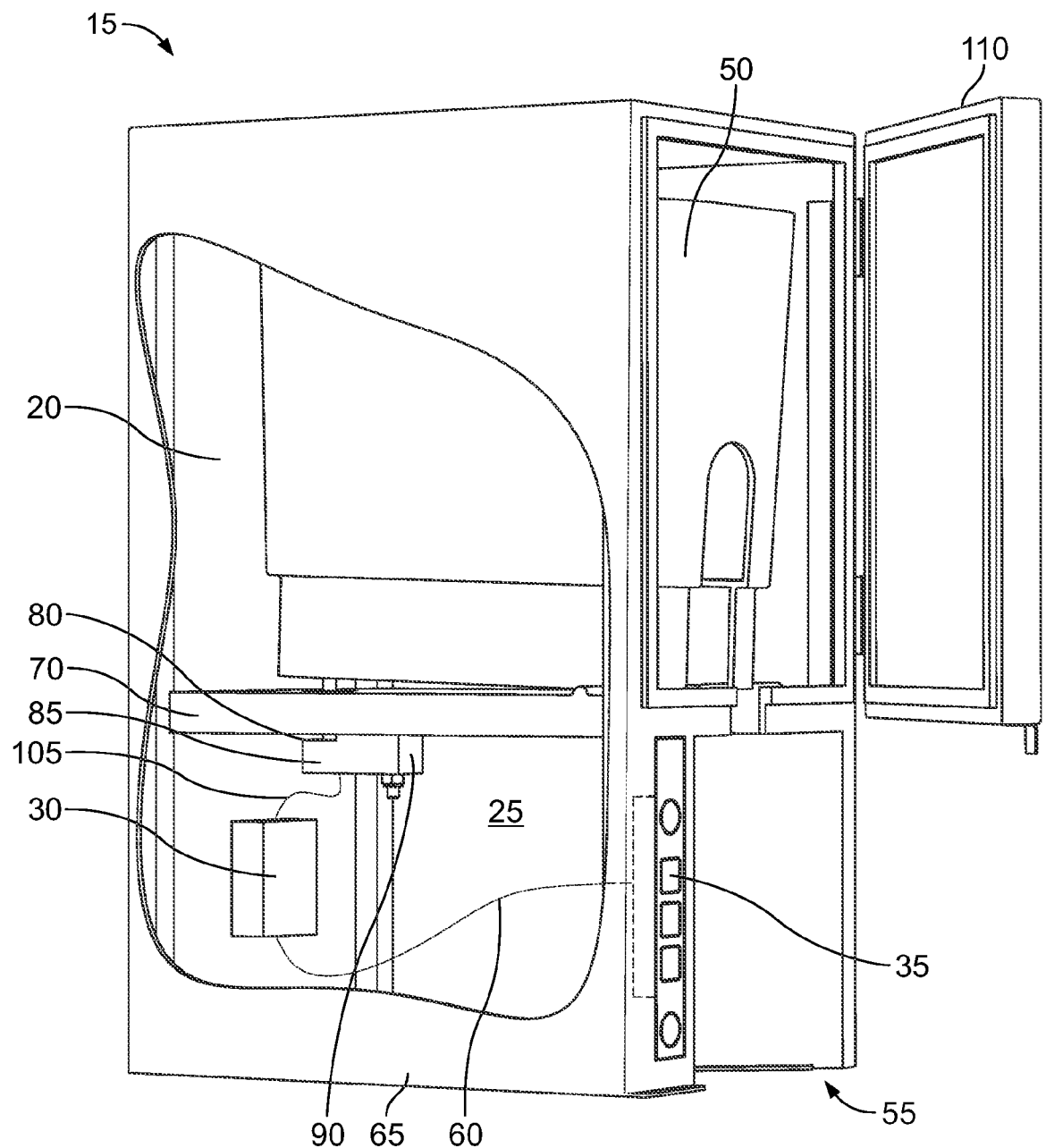
FIG. 2 is a partial cut-a-way of the dispenser shown in FIG. 1.
Figure 3:
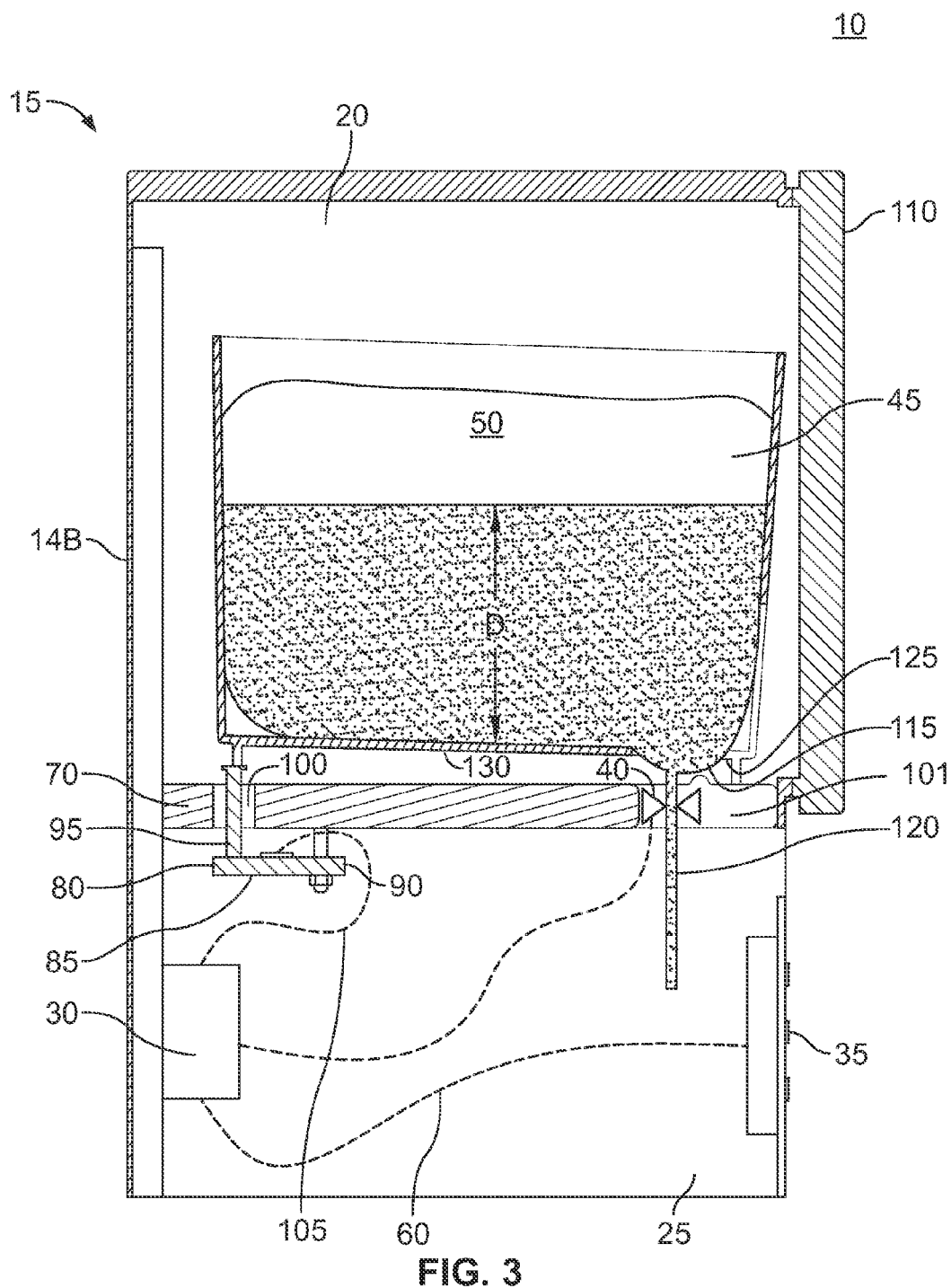
FIG. 3 is a cross sectional view of the dispenser shown in FIG. 1.
Figure 4:
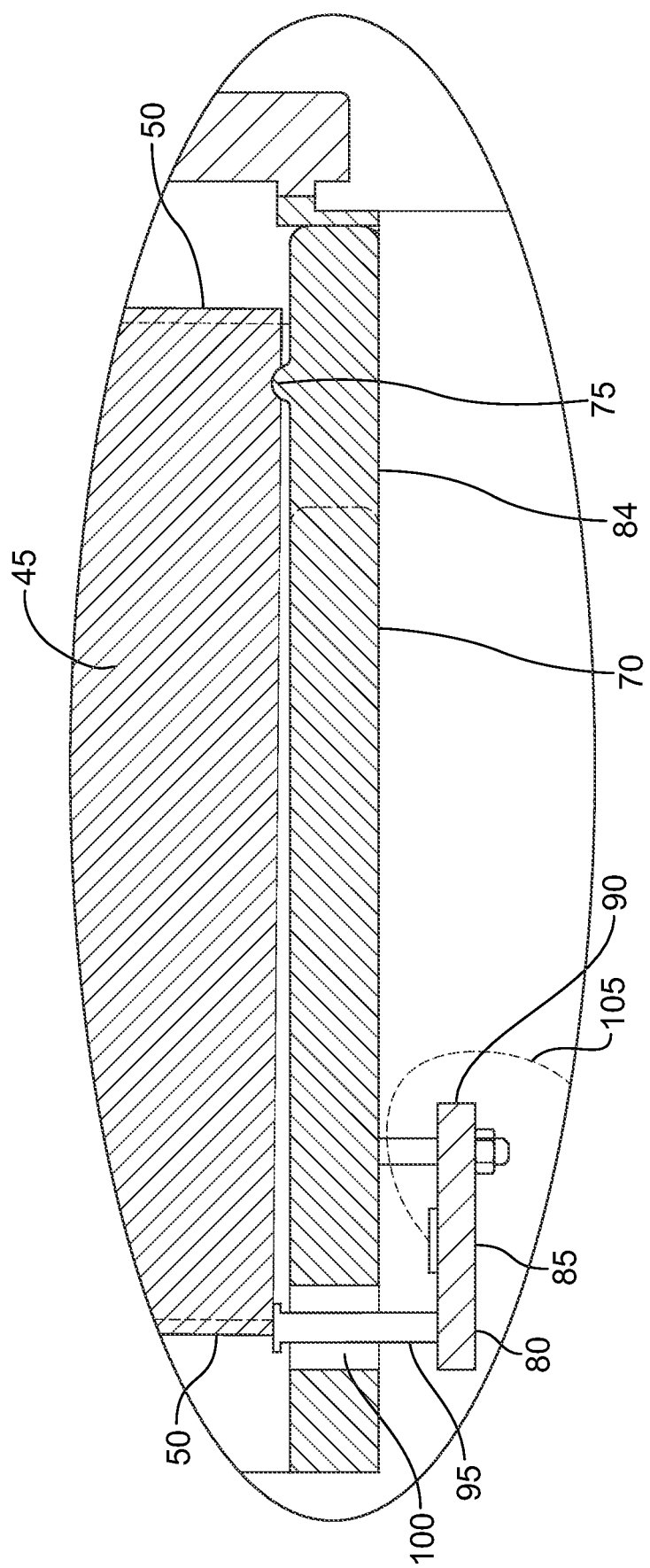
FIG. 4 is an isolated view of a load cell supporting part of a container in the dispenser shown in FIGS. 1-3.

FIG. 2 is a partial cut-away view of the left side of the liquid dispensing apparatus 10 shown in FIG. 1. FIG. 3 is a cross-sectional view of the cabinet viewed from the left-hand side 65 of the cabinet 15. FIG. 3 also depicts one embodiment of a container 50 that holds liquids and which is formed of a rigid plastic. FIG. 4 is an isolated view of the apparatus 10 showing in cross section, details of a shelf 70 that defines the upper 20 and lower 25 compartments. FIG. 4 shows how the front end of the container 50 pivots on a fulcrum or ridge 75 that extends into and out of the plane of the figure and which rises upwardly from the top surface of the shelf 70. FIG. 4 also shows how the back end of the container 50 is supported on one end 80 of a load cell 85 that is cantilevered from an opposite end 90 by a bolt driven into the underside of the shelf 70.

The front end of the container 50 rests on the fulcrum 75 formed into the top surface of the shelf 70. The container 50 is thus able to pivot over the fulcrum 75.

The back or rear end of the container 50 rests on an elongated, upright post 95 that extends downwardly from the underside of the container 50, through a hole 100 formed in the shelf 70, onto the cantilevered end 80 of the load cell 85. Since the fulcrum 75 supports part of the container's weight, only a portion of the container's weight is supported by the fulcrum 75. The rest of the container's weight is supported by the second end 80 of the load cell 85.

The portion of the container's weight that is impressed on the load cell 85 causes the load cell 85 to deflect. Load cell deflection changes the electrical resistance of a Wheatstone bridge circuit that is attached to the load cell 85. Since the load cell 85 deflection is proportional to the weight impressed on the load cell by the container 50 and its contents, the signal "output" from the load cell 85, and which is sent to the computer 30 via the connection wires 105, represents at least a fractional amount of liquid in the container 50.

In an alternate embodiment, the entire weight of the container and its contents is supported by one load cell. In one such alternate embodiment, a load cell is located above the center of mass for the container and its contents. A hook is attached to load end of the load cell. A liquid container is suspended from the load cell. The entire weight of the container and its contents is thus measured. Other embodiments use two or more load cells, with each load cell supporting a fractional portion of the container. One embodiment uses four load cells at each corner of the container 50 or at each corner of the cabinet 15. In multiple-load cell embodiments, the outputs of the various load cells are summed by the computer 30 and provide a fairly accurate measurement of the entire weight of the container and/or cabinet 15.

A hinged door 110 provides access to the interior of the upper compartment 20 and to the lower compartment 25. In one embodiment depicted in FIG. 3, the container 50 is a rigid bin or basin, which holds a flexible bag 115, and which contains the liquid 45 to be dispensed. The bag 115 is formed with an integral liquid dispensing tube 120. The dispensing tube 120 extends from the bag 115 through a hole 125 in the bottom 130 of the container 50, through a passage 101 formed into the shelf and through the pinch valve 40. Wires connect the pinch valve 40 to the computer 30. Plastic bags containing liquid to be dispensed can be placed into the container and removed from the container via the door 110.

To dispense a fixed volume of liquid, a signal from the computer 30 instructs a solenoid controlling the valve 40 to open, i.e., "unpinch," the tube 120 by actuating the pinch valve to an open position. Opening the pinch valve allows liquid to run out of the container through the tube. The tube 120 is kept unpinched by the computer 30 for a time period that is only long enough to dispense the volume of liquid that was requested by a user at the push button switches 35. When the time required to keep the valve open has elapsed, the pinch valve is closed. In a preferred embodiment, the pinch valve is biased by a spring to be normally closed. The signal from the computer 30 to the valve solenoid thus holds the valve 40 open against the spring. Closing the valve simply requires the valve open signal from the computer to be shut off The time that the valve must be held open to dispense a particular volume of liquid requested by operation of one or more switches essentially depends on the pressure of the liquid at the valve 40, just before the valve is opened. The pressure of the liquid 45 on the valve 40 depends on the depth of the liquid 45 above the valve 40. In the figures, the depth of the liquid 40 above the bottom 130 of the container storing the liquid to be dispensed is denoted by the letter D. A relatively short but nevertheless additional column of liquid exists in the tube that is between the bottom of the container and the pinch valve 40.

In the preferred embodiment, the depth D of the liquid in the tank or container 50 is determined from a weight measured by the load cell 85. As is well known, a load cell is essentially a strain gauge in combination with a resistive circuit well known to those of ordinary skill in the electrical arts as a Wheatstone bridge circuit. When the load cell deforms in response to an applied force, the electrical characteristics of the Wheatstone bridge circuit change. The electrical characteristics of the Wheatstone bridge can thus be correlated to a weight supported by the load cell 85. If the density of the liquid is known, and if the geometry of the container is known, the depth of the liquid in a container can be derived from the weight of the container and contents, or from just the weight of the liquid in the container.

Figure 19:
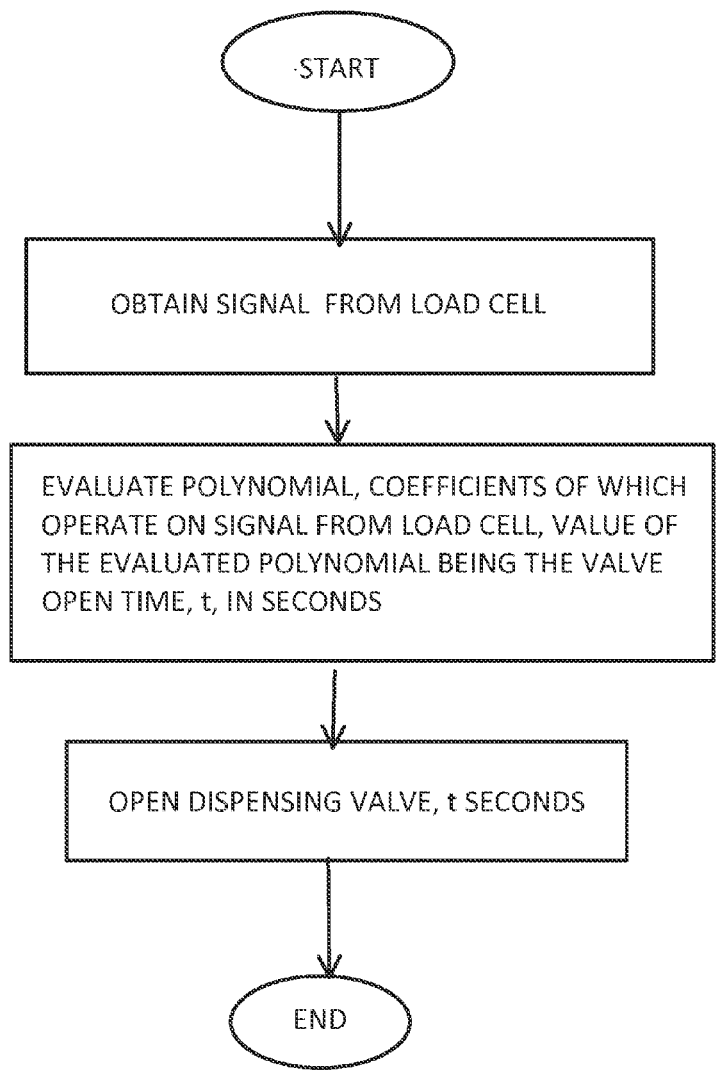
FIG. 19 is a flow chart depicting steps of a method to dispense a volume of liquid.

In the preferred embodiment, the time that the valve must be kept open to dispense a user-requested volume of liquid is determined by evaluating a polynomial that effectively correlates a signal obtained from the load cell 85 to the time required to open the valve 40 to dispense a requested volume. See FIG. 19. In the preferred embodiment, the polynomial was experimentally determined to be of the form:

$$y = Ax^3 + Bx^2 + Cx + K$$

where A, B and C are coefficients and K is a constant;
x is the load cell output signal and
y is the valve open time, in seconds.

In tests of a prototype liquid dispenser having one end of the container 50 supported on a fulcrum 75 and the opposite end supported by a load cell 85 essentially as shown in FIG. 3 and using a pinch valve as described in the aforementioned co-pending application, the coefficients required to dispense one ounce of liquid from the container were determined to be: A=−0.0012, B=0.0207, C=−0.1444 and K=0.89.

Figure 5:
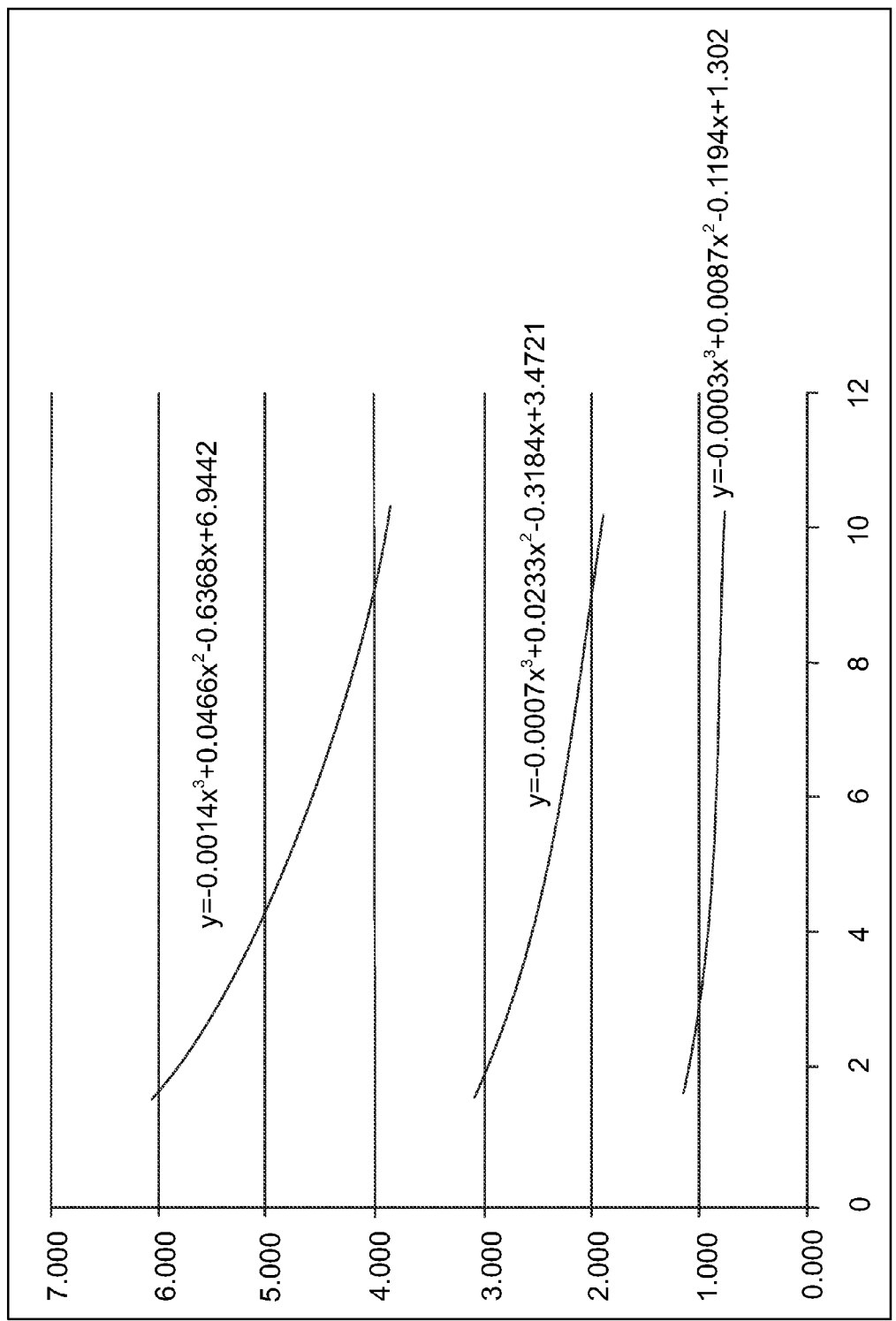
FIG. 5 is a graph depicting plots of different polynomial functions that model experimentally-determined valve open times as a function of liquid level and a user-requested volume, for the dispenser shown in FIG. 13.

FIG. 5 depicts plots of a third-order polynomial for three different requested volumes from the prototype described above. Values along the x axis are different outputs from the load cell, typically a D.C. voltage. The y-axis is the time in seconds required for the valve to be kept open in order to dispense a volume of liquid represented by each curve.

Each curve in FIG. 5 is the plot of a polynomial for a different requested volume. The lowest curve is a plot of the polynomial that determines the valve open time for a first volume of liquid. The middle curve is a plot of the polynomial that determines the valve open time required to dispense a second volume of liquid, greater than the first volume. The top curve is a plot of the polynomial that determines the valve open time required to dispense a third volume of liquid, greater than the second volume. The three polynomials have different coefficients.

The polynomial that models the required valve open time was determined experimentally by measuring volumes of liquid dispensed through a pinch valve when the pinch valve was kept open for a given length of time, with different measured weights of liquid in the container, i.e., with differing liquid heights. The polynomial thus works to determine valve open times required to dispense a volume of liquid from a particular type of container, namely the one shown in FIGS. 1-3 and having a particular size, a particular discharge tube, having particular characteristics, e.g., length and inside diameter. The polynomial, which is determined experimentally, correlates a measured weight of the container and liquid to a required valve open time, regardless of the container's shape. Using a different container and/or discharge tube requires different polynomials and/or constant to be determined, preferably by curve fitting, as was done in the preferred embodiment.

In another alternate embodiment, which avoids computing a polynomial, the computer 30 reads or is otherwise provided with a load cell output voltage. The output voltage is used as a pointer into a table, typically stored in RAM, EEPROM, ROM or other computer memory device, from which the computer 30 can read an amount of time required to hold the valve open. If the load cell outputs a voltage that is not in the table, e.g., 7.02 volts, software in the computer 30 rounds the value up or down, as a design choice, to the closest value in the table.

In FIGS. 17A-17E, the valve open times are listed in the right-hand column and are expressed in seconds of time required to hold the valve open in order to dispense one ounce of liquid. The valve open times in the right-hand column were determined by evaluating the third order polynomial equation shown at the top of FIG. 17A and storing each resultant valve open time as a table with the corresponding load cell output vales. Dispensing volumes other than one ounce simply requires a corresponding fraction or multiple of the 1-ounce valve open time to be used.

By way of example, and using FIG. 17A, if the load cell output voltage is 7.2 volts, the valve open time required to dispense one ounce of liquid from the dispenser 10 is 0.4755 seconds. The time required to dispense two ounces would be double the amount of time required to dispense one ounce, i.e., about 0.9510 seconds. The time required to dispense one-half ounce would be one-half the 0.4755 seconds to dispense one ounce, i.e., about 0.2377 seconds.

Figure 18:
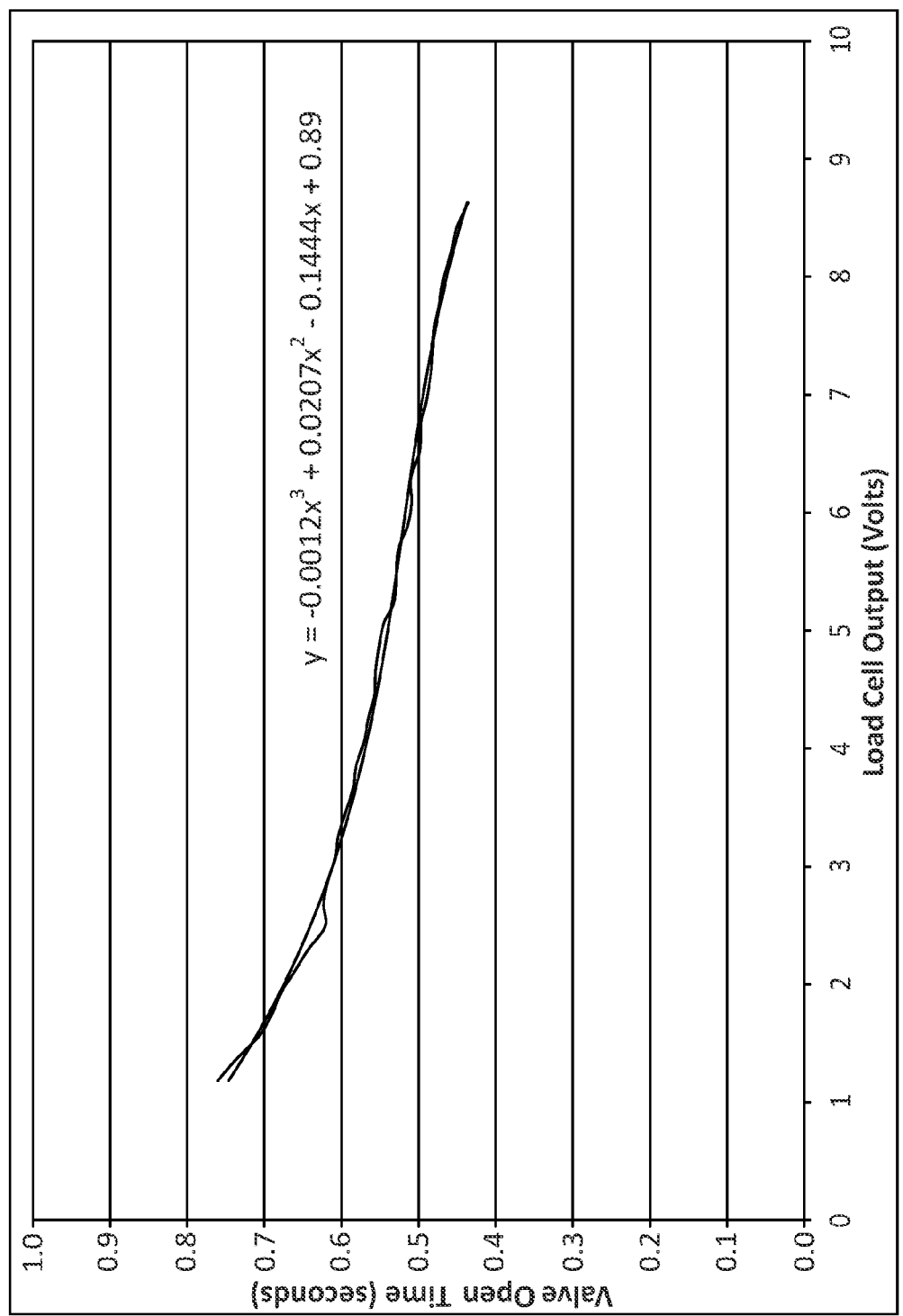
FIG. 18 is a plot of a third-order polynomial from which the table in FIGS. 17A-17E was generated.

FIG. 18 shows a plot of the polynomial from which the table in FIGS. 17A-17E was generated. The load cell output voltage decreases as the liquid in the container decreases. The valve open time, which is the time required to dispense one ounce of liquid, increases as the load cell output decreases in response to liquid being depleted from the container. Additional methods and apparatus for determining liquid in a tank are described below.

As mentioned above, the depth D of the liquid determines a static pressure at the valve 40. The static pressure at the valve 40 determines the flow rate of the liquid 45 through the valve 40. The flow rate of the liquid 45 through the valve 40 determines the time that the valve 40 must be held open to dispense a requested volume (or a requested weight of a liquid to be dispensed). The time required to hold the valve open to dispense a particular volume of liquid is therefore dependent on the amount of liquid in a container, prior to opening the valve 40 since the amount of liquid 45 in a particular container inherently determines the liquid's height therein. The experimentally determined polynomial described above is thus considered to be one that correlates an amount of liquid in a container to an amount of time required to hold the valve open to dispense a requested volume. Evaluating the polynomial thus inherently includes a determination of a depth of the liquid in the container. A valve open time is thus determined empirically, by evaluating the polynomial using for x, the signal output from the load cell prior to opening the valve and which corresponds to the weight supported by the load cell 85.

FIG. 4 shows in greater detail, how the load cell 85 is attached to the underside of the shelf 70 in the preferred embodiment to support at least part of the weight of the container 50, and how the front of the container 50 rests on a ridge or fulcrum 75. One end 90 of the load cell 85 is bolted to the underside of the shelf 70. A space is shown between the load cell 85 and the shelf 70 to illustrate that the load cell 85 is essentially cantilevered at the first end 90.

The second end 80 of the load cell 85 supports a vertical post 95. The post 95 extends upwardly from the second end 80 of the load cell 85, through a hole 100 in the shelf 70 and into engagement with the bottom of the container 50. The load cell 85 thus supports at least half the weight of the container 50. As the volume of liquid 45 in the container decreases, the force impressed on the load cell 85 will change accordingly, as will the output signal from the load cell 85. Each time that a volume is requested by a user, the instantaneous value of the load cell output signal is read by the computer 30 and used as an input value of x in the polynomial. Evaluation of the polynomial using appropriate coefficients will yield a value that is the amount of time that the valve should be held open to dispense the requested volume.

While the preferred embodiment determines the valve open time using a load cell, alternate methods of determining the valve open time are made by determining the actual height of the liquid 45 in a tank 50 prior to opening the valve. Various ways of detecting the depth of the liquid are depicted in FIGS. 6-16 and described below. The structures in FIGS. 6-16 that determine the depth of the liquid 45 in the tank or container 50 are different from each other yet functionally equivalent. Each is a different means for determining the depth of a liquid in a container.

Those of ordinary skill in the art will recognize that if the weight of container 50 is known, the weight of the liquid 45 inside the container 50 can be determined by a straight-forward subtraction of the container weight from the gross weight of the container and liquid combined. Knowing the weight of the liquid inside the container enables the volume of liquid to be determined using the density of the liquid. If the dimensions of the container 50 are known and if the volume inside the container is known, the depth of the liquid 45 inside the container can be determined from a straight-forward calculation. The depth of the liquid can therefore be determined directly from the signal from the load cell. The load cell implementation is thus an equivalent means for determining the depth of the liquid in the container, i.e., the liquid surface height inside the container.

Figure 6:
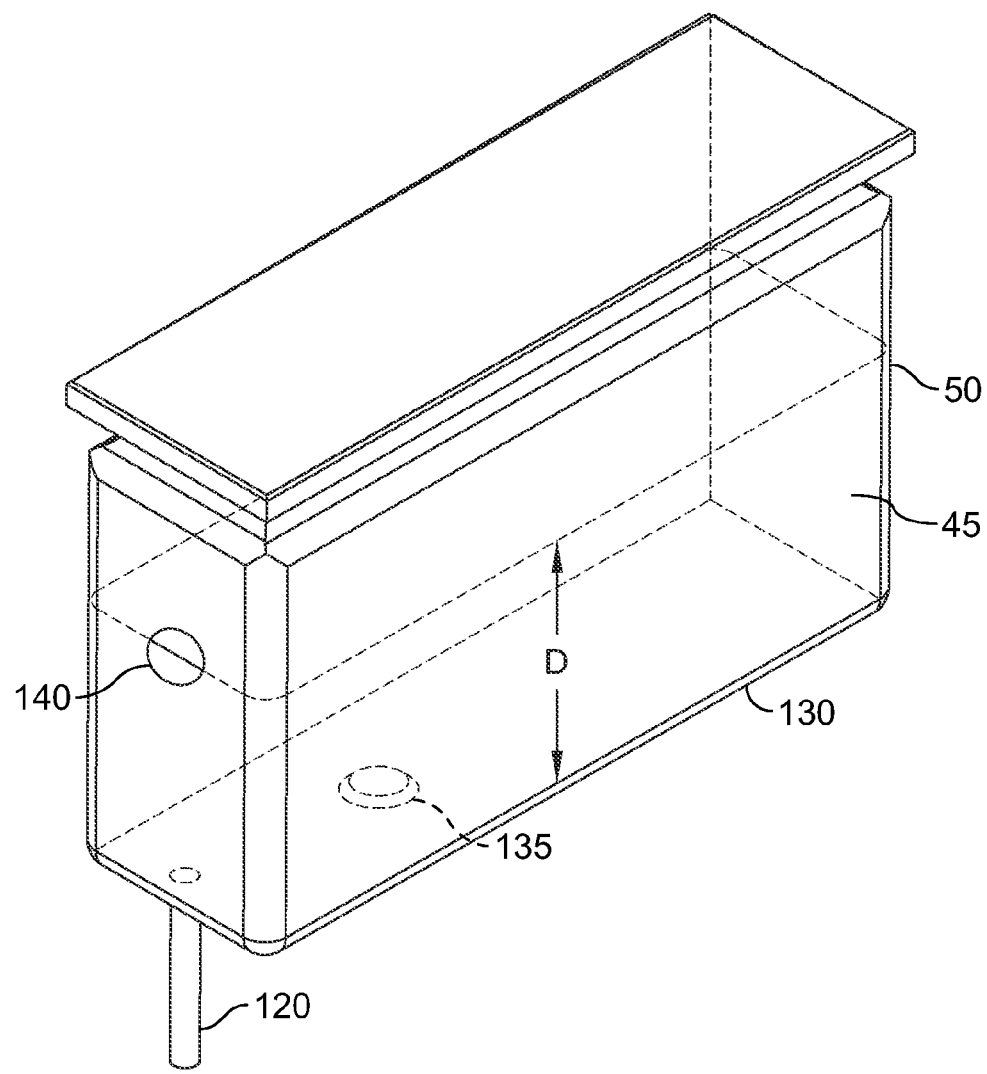
FIG. 6 is a perspective view of an alternate embodiment of a container for holding liquids to be dispensed and showing a different liquid sensor.

In FIG. 6, reference numeral 135 identifies a static pressure sensor affixed to the bottom 130 of the tank 50. The diaphragm of the pressure sensor has one side exposed to the liquid and the other side is either a vacuum or atmosphere. In this case, the sensor does not have to be exposed to the outside of the container, i.e., through a hole in the bottom. It is a so called absolute sensor. Those or ordinary skill in the art will recognize that static pressure exerted on the sensor 135 will decrease as the depth D of the liquid 45 decreases. An optional sight glass 140 enables a user to peer into the tank 50 and inspect the contents thereof.

Figure 7:
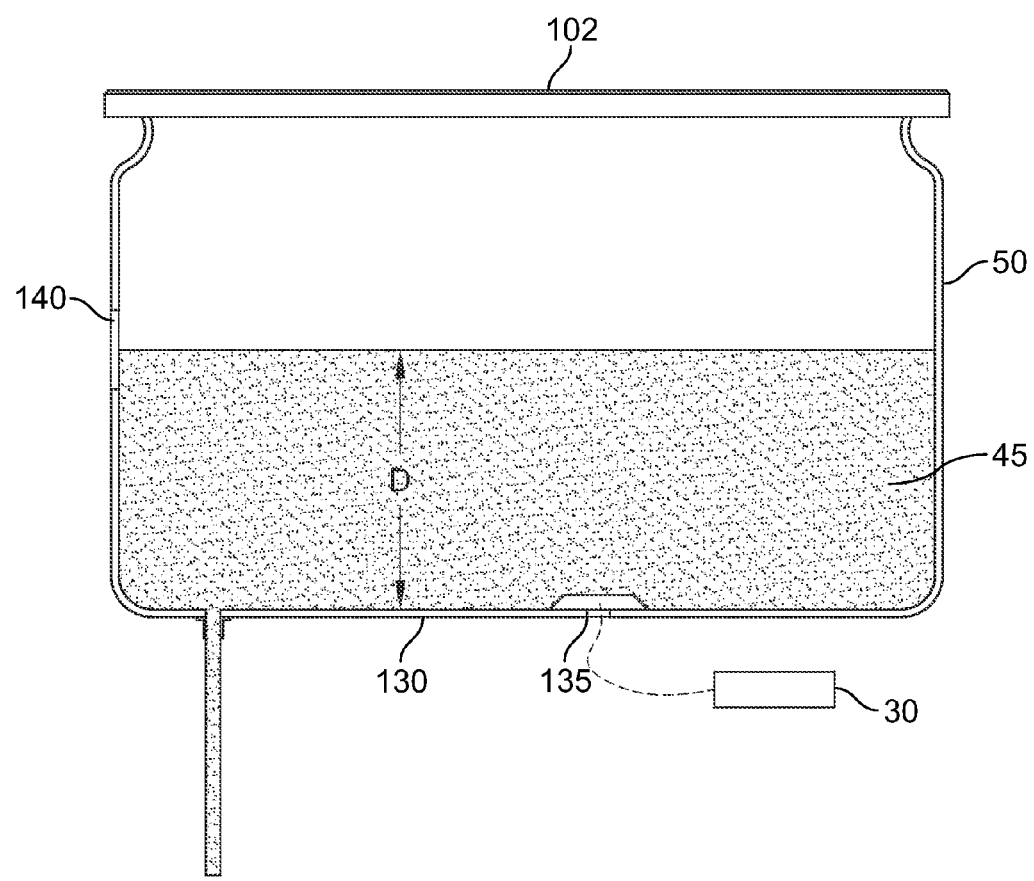
FIG. 7 is a cross sectional view of the container shown in FIG. 6 showing a pressure sensor.

FIG. 7 is a side view of the pressure sensor 135 depicted in FIG. 6 is shown connected to the computer 30. Not shown in FIG. 6 are the pinch off valve 40, the user interface switches 35 and connections between the pinch-off valve 40 and switches 35 and the computer 30. These are also not shown in FIG. 7 for clarity.

Figure 8:
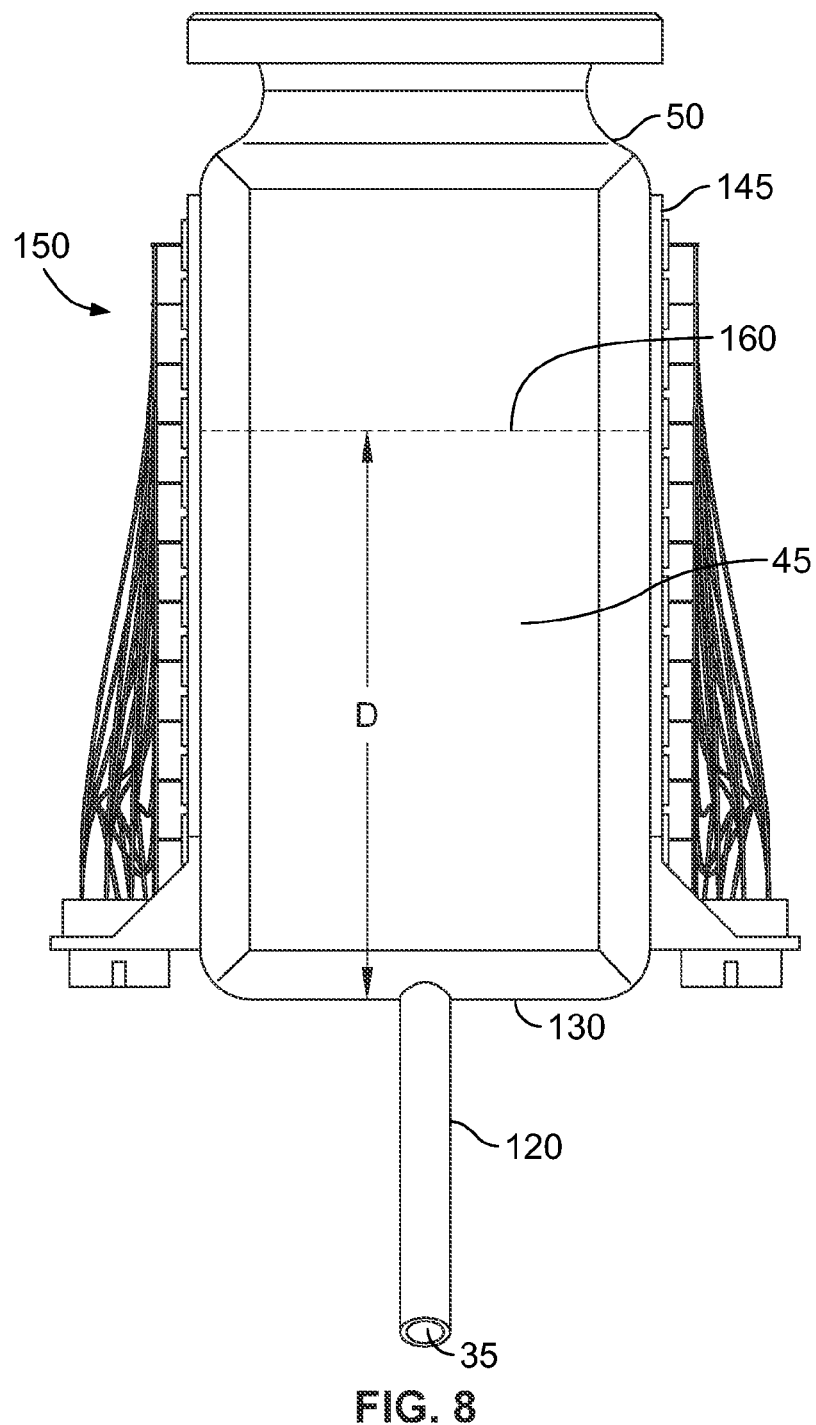
FIG. 8 is an end view of an alternate embodiment of the container shown in FIGS. 6 and 7.
Figure 9:
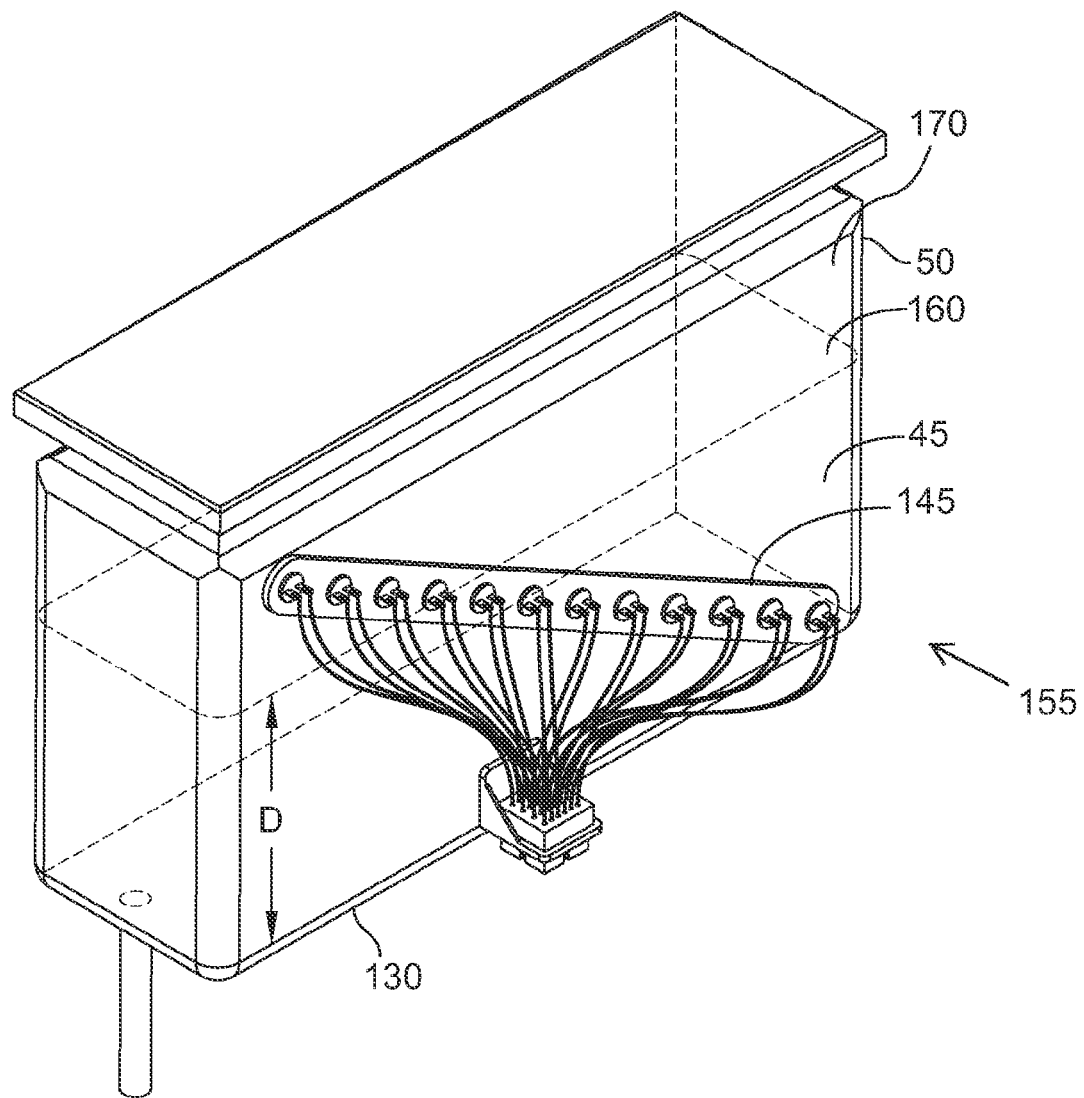
FIG. 9 is a perspective view of the right hand side of a container showing another embodiment of a liquid sensor.

FIG. 8 depicts an array of photodiodes 145, i.e., diodes that detect light and which output an electrical signal representative thereof and an array of light emitting diodes 150 on the opposite side of the container 50. The photodiodes 145 are shown in FIG. 9 as being coupled to the right-hand side 155 of the tank 50 and arranged along an inclined line. The photodiodes 145 are thus considered to be an inclined linear array, which permits diodes to be vertically closer to each other than might be possible if the photodiodes 145 were in a vertical array. The elevation of each photodiode 145 above the bottom 130 of the tank 50, is of course, known to the computer 30.

In one embodiment, the tank 50 is constructed of either translucent or at least partially-translucent material such as glass or Plexiglas. The array of photodiodes 145, which detect ambient light, is attached to one side of the container as shown in FIG. 9. If the liquid 45 in the container is opaque or at least partially opaque, voltage output from the photodiodes below the surface of the liquid, i.e., at elevations less than the height D of the liquid in the tank, will be zero or nearly zero. Voltage output from diodes 145 above the liquid's surface, i.e., at an elevation above the height D, will be greater than zero or at least greater than the voltage output from diodes below the surface of the liquid. The level of the liquid can thus be determined, or at least estimated, by determining the elevation of the first diode above the bottom 130, having a greater-than-zero or at least greater than other photodiodes 145 below the liquid surface.

Figure 10:
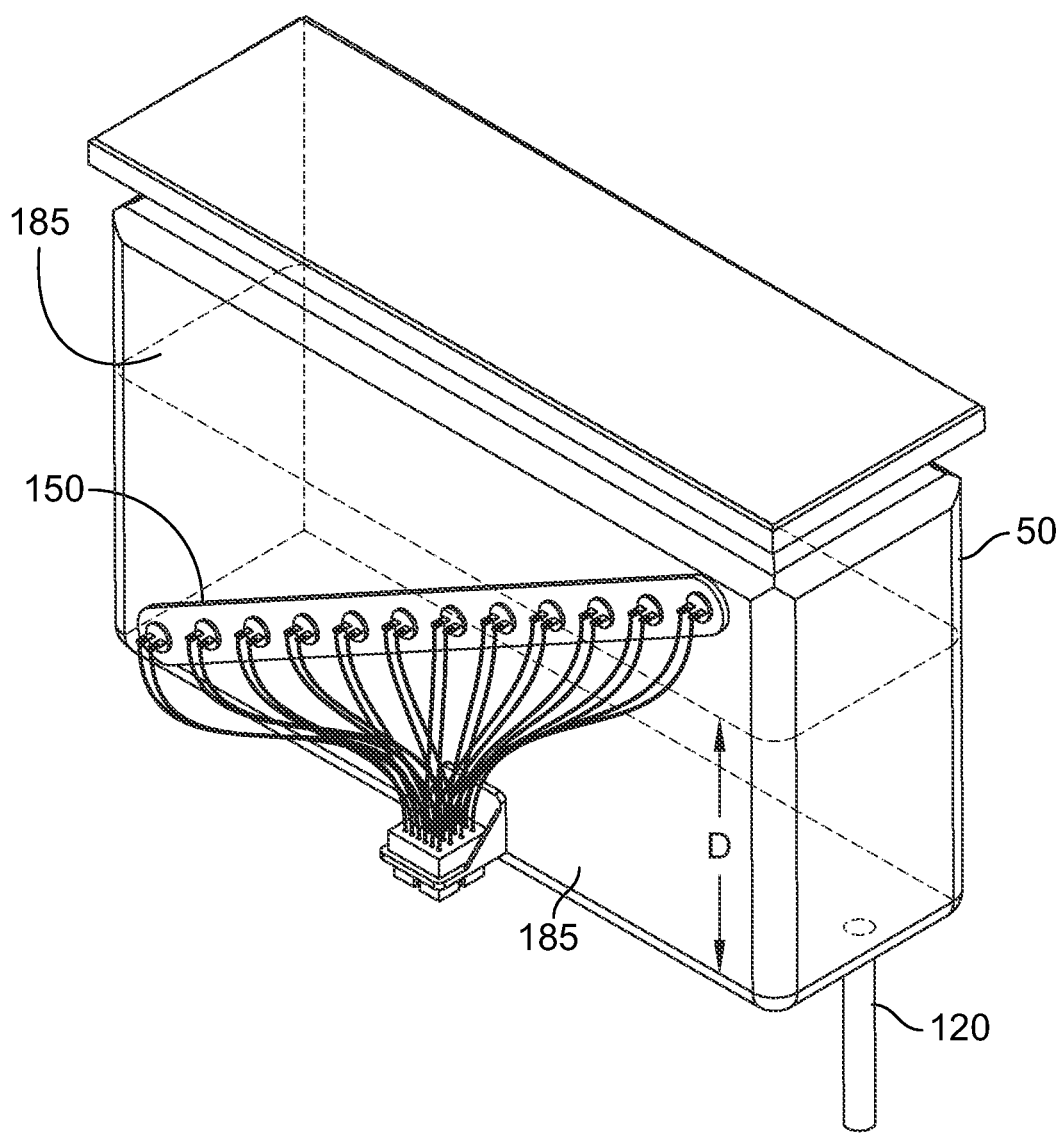
FIG. 10 is a left side perspective view showing light sources used with another embodiment of a liquid sensor.

In another embodiment, the photodiodes 145 detect infrared and/or visible light emitted from an opposing array of IR or visible-light emitting diodes (LEDs) 150 arranged on the opposite side of the translucent or semi-translucent tank 50 as shown in FIG. 10. If the liquid 45 in the tank 50 is at least partially opaque, photodiodes 145 below the top of the surface 160 of the liquid 45 will not detect light emitted from the LED's 150 and will have zero or near-zero output voltages. As with the diodes that detect ambient light, light from the LED's 150 that is detected by one or more of the photodiodes 145 permits the liquid height D to be accurately estimated or determined exactly by comparing the voltages output from all the photodiodes.

Figure 11:
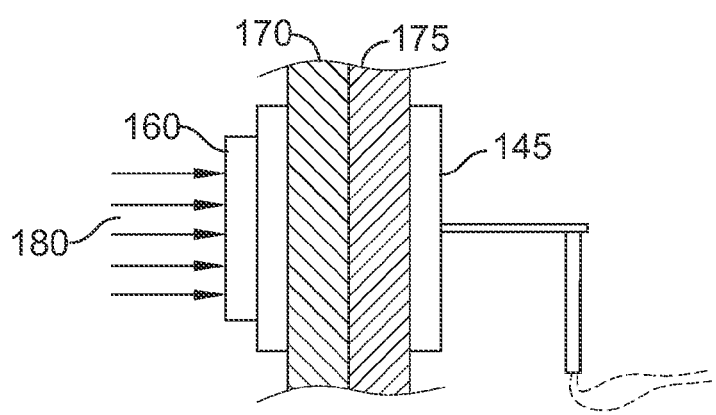
FIG. 11 is a cross sectional view of an optical liquid detector/sensor.

FIG. 11 is cross-sectional diagram of one photodiode 145. A lens 160 on the inside surface of the side wall 170 of the container 50 detects light incident on the lens 160. A collar 175 provides a liquid-tight seal for the diode 145 so that liquid does not leak passed the wall 170. Small voltages generated by the light 180 that impinges the diode 145 cause the diode to generate a small electrical signal which can be amplified and detected as being present or absent by the computer 30.

Figure 12:
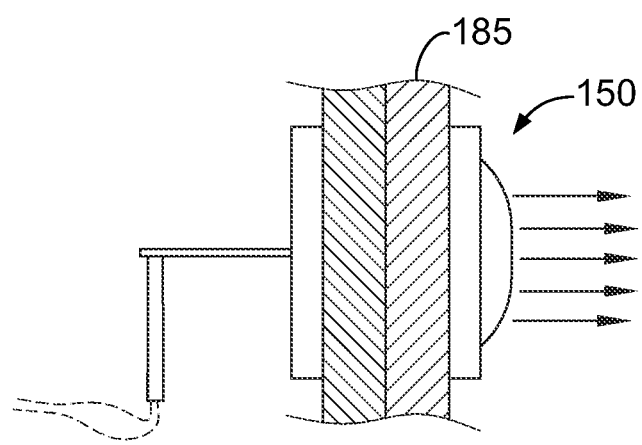
FIG. 12 is a cross sectional view of a light source.

FIG. 12 depicts the similar structure of a light emitting diode 150, inserted through the side wall 185 of the tank 50, opposite the side wall 170 holding the photodiodes 145.

Figure 13:
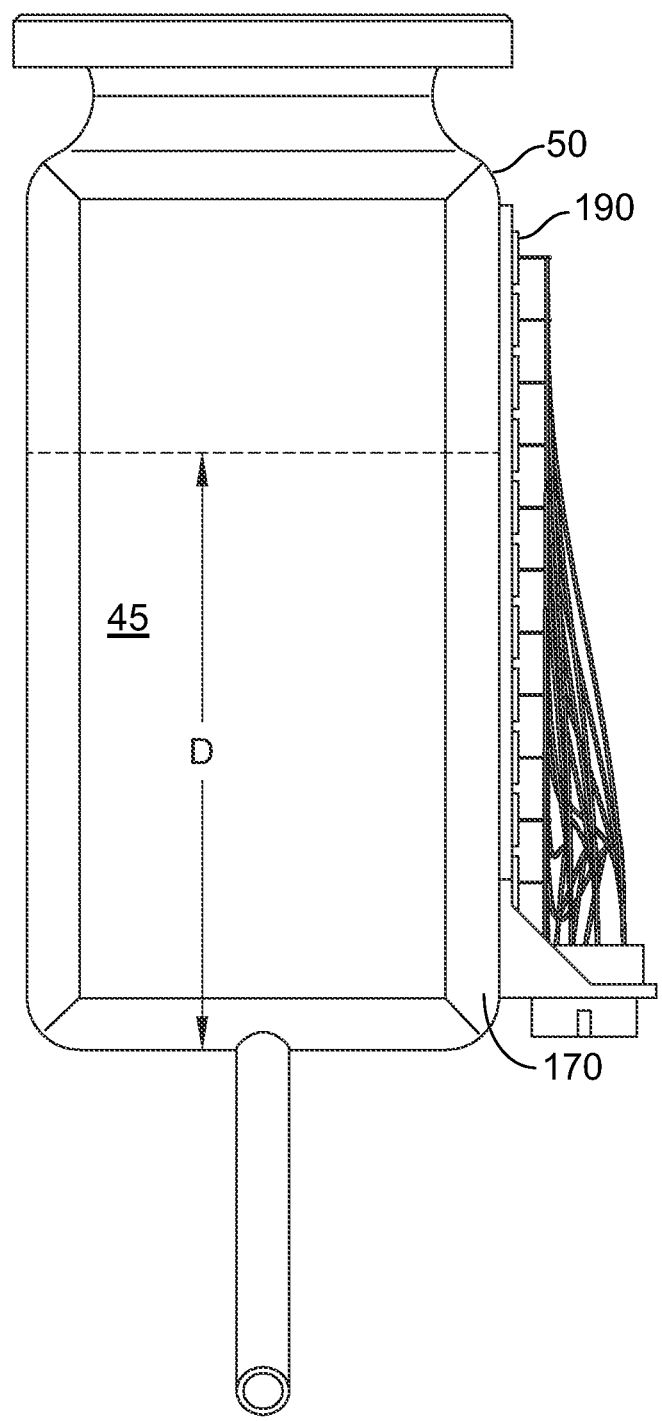
FIG. 13 is a front view of an alternate embodiment of a container and showing an alternate liquid sensor.

FIG. 13 depicts another structure for determining the depth of liquid 45 in the container. FIG. 13 is a front view of the container 50 and shows an array of conductivity or resistance probes 190 configured to extend through the side wall 170 so that the probes 190 "reach" into the interior of the container 50.

Figure 14:
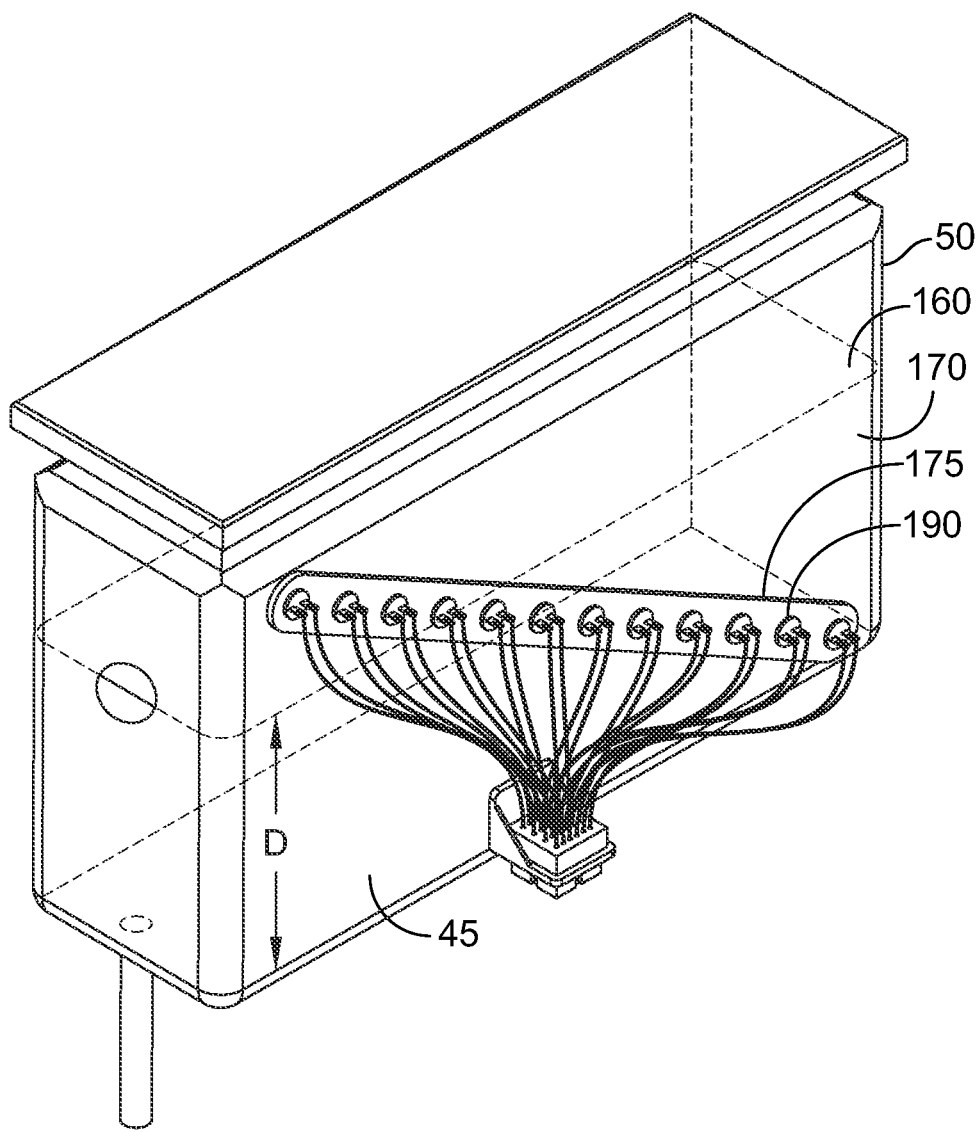
FIG. 14 is a perspective view of the container shown in FIG. 13.

FIG. 14 is a perspective view of the right-hand side of the tank, showing the conductivity probes 190 to be arranged in an inclined, linear array. As with the photodiodes and LEDs, the inclined array 190 permits more probes to be used, with less vertical separation distance between them.

Figure 15:
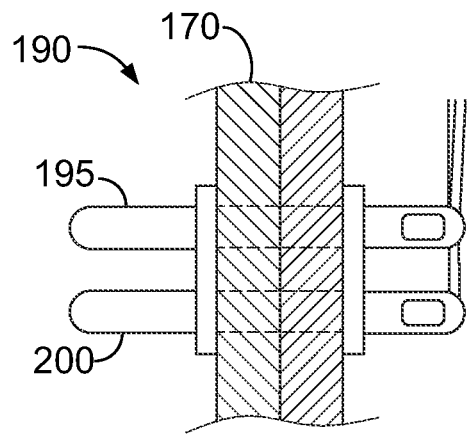
FIG. 15 is a cross sectional view of a detector or sensor for use with the container shown in FIGS. 13 and 14.

FIG. 15 is a top view of one of the probes 190. If a conductive pathway exists between the two conductors 195 and 200, as will happen when the conductors are submerged in even a partially-conductive liquid like milk or cream, an electrical signal applied to one conductor 195 can be detected at the adjacent conductor 200. A conductive pathway will exist if the depth D inside the tank 50 is high enough for liquid to be between the two conductors. Cream has a conductivity greater than 10 times greater than air.

Figure 16:
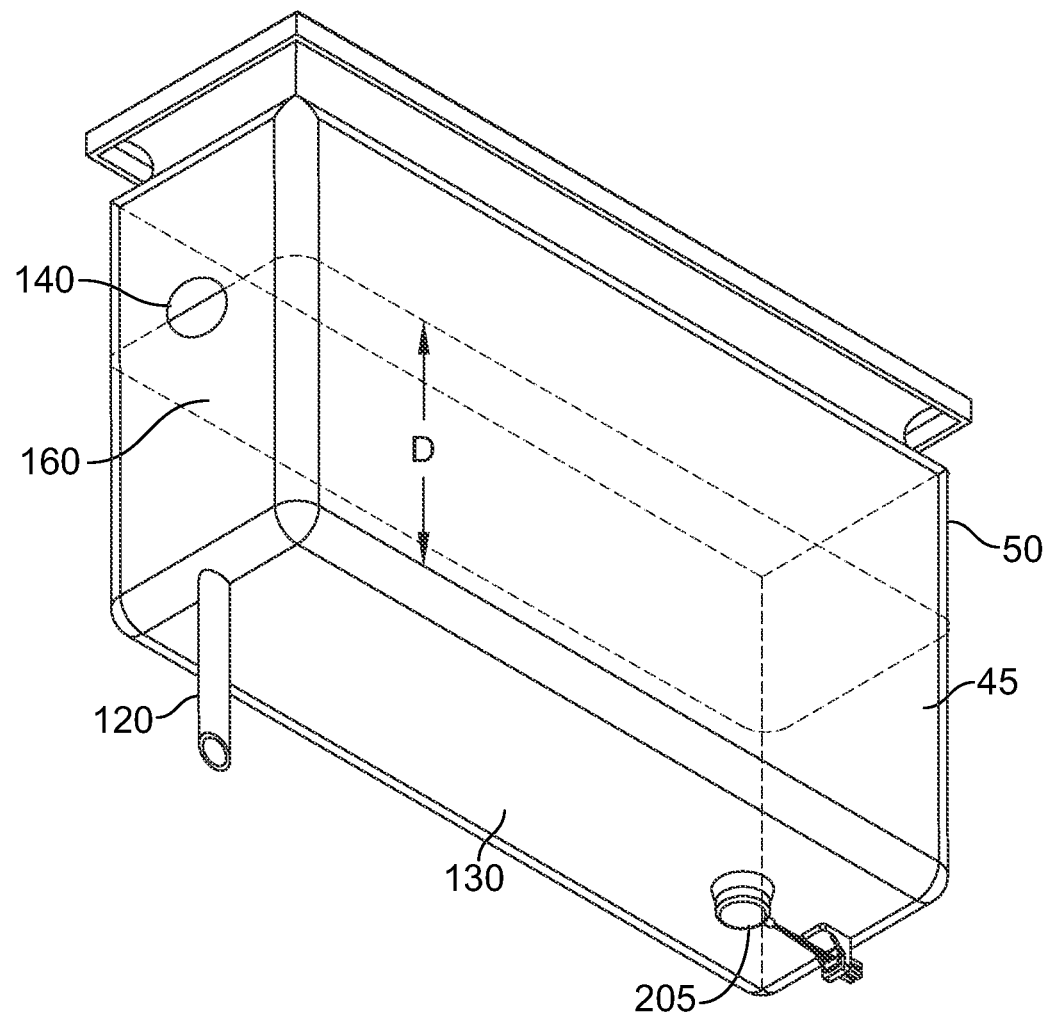
FIG. 16 is a perspective view of another embodiment of a container and another liquid detector.

FIG. 16 depicts an ultrasonic transducer 205, acoustically coupled to or through the bottom 130 of the tank 50. Sound waves emitted from the ultrasonic range finder transducer 205 will be reflected at the interface between the liquid surface 160 and the empty upper portion of the tank 50. The time required for an ultrasonic pulse to transit from the transducer 205 to the interface and return can be used to directly calculate the depth d of the liquid in the tank 50. In an alternate embodiment not shown, the ultrasonic transducer 205 can be mounted at the top of the tank so as to transmit ultrasonic waves downward to the top 205 of the liquid 45.

Once the liquid level is determined using one or more of the embodiments shown, a close approximation of the time required to hold the valve open to dispense a requested volume can be directly calculated using a well-known equation inset below. Equation (1) inset below, is an equation to calculate the time required to hold the valve open in order to dispense a volume of liquid from a tank. The dispensed volume will of course lower the height of the liquid in the tank from an initial height $h_0$ to a lesser height denominated as $h_2$. The valve open time $t_{open}$ is a function of the starting and ending depth of the liquid in the tank and the ratio of the area of the tank to the cross sectional area of the tube through which the liquid discharges.

$$t_{open} = \frac{\sqrt{h_0} - \sqrt{h_2}}{\sqrt{g/2}} \left(\frac{A_{tank}}{A_{jet}}\right)^2 \quad \text{Eq. 1}$$

In Equation 1:
  $t_{open}$=the time required to hold the valve open to dispense a user-specified volume of liquid from a tank;
  $h_0$=the initial or starting level of liquid in the tank before the valve is opened, measured from the top of the liquid to the lowest level of the tank, i.e., at the pinch valve;
  $h_2$=the final level of liquid in the tank to which the initial level $h_0$ drops after the user-specified volume is dispensed;
  g=the gravitational acceleration constant;
  $A_{tank}$=the surface area of the top of the tank;
  $A_{jet}$=the cross sectional area of the jet or tube through which liquid leaves the tank;

Equation (1) is by Yunus A. Cengal and John M. Cibala, FLUID MECHANICS, FUNDAMENTALS AND APPLICATIONS, pp. 179-180, McGraw Hill, Higher Education, copyright 2006.

The various structures described above can determine an actual depth of liquid in a container. Knowing the actual depth D of the liquid thereby permits a direct calculation of the valve open time that is required to dispense a specific volume of liquid, such as one ounce, two ounces, three ounces, and so forth.

For clarity purposes, opening the dispensing valve 40 is comprised of the steps of the computer 30 receiving one or more signals from the user interface or switches 35 located on the container 15. Those switches 35 can be configured under software control to dispense multiple volumes on each actuation or to dispense volumes that are additive of the particular switches that are activated. Once a volume of liquid to be dispensed is specified, the liquid surface height is determined empirically using one or more of the structures and devices described above and equivalents thereof. Once the requested volume is known and the liquid level height is known, the computer 30 calculates the open time and sends an appropriate signal to the solenoid or an interface thereof to open the valve and, of course, close the valve at the termination of the time period.

Those of ordinary skill in the art will recognize that the method of determining valve open time using equation (1) can be used with any size container and any size discharge tube. By specifying the surface area of the container and the cross sectional area of the discharge tube, the calculation of valve open time remains a straight forward calculation using the level of the liquid in the container, which can be empirically determined using one or more of the structures disclosed herein.

The foregoing description is for purposes of illustration only. Those of ordinary skill will recognize that the foregoing methods and apparatus' for the liquid dispenser include measuring and dispensing liquids. They can be used to dispense liquids that include water, alcohols, dairy products like milk and cream and mixtures thereof as well as oils and syrups. The foregoing description should therefore not be construed as limiting the method and/or apparatus to dispensing small volumes of liquids but is really for purposes of illustration. The true scope of the invention is set forth in the appurtenant claims.

What is claimed is:

1. A method of dispensing a user-specified volume of liquid from a container, the method comprising:
  opening a valve connected to the container to dispense the user-specified volume of liquid through the valve, a length of time that the valve is required to be open being determined from a weight impressed on a load cell by the container;
  said length of time being determined by evaluating a polynomial having coefficients, the coefficients of the polynomial operating on a value, which is representative of a signal obtained from the load cell.

2. The method of claim 1, wherein determining the time the valve is required to be open comprises measuring at least a portion of the weight of the container and the liquid it contains.

3. The method of claim 1, wherein said length of time is determined prior to each opening of the valve, by evaluating a polynomial having coefficients, the coefficients of the polynomial operating on a value, which is representative of a signal obtained from the load cell.

4. The method of claim 3, wherein the polynomial is a third order polynomial.

5. The method of claim 1, wherein the container is a plastic bag.

6. The method of claim 1, wherein the container is a basin.

7. The method of claim 1, wherein the liquid is a dairy product.

8. The method of claim 1, wherein the weight impressed on the load cell is at least one of:
  the combined weight of the container and the liquid; and
  the weight of the liquid.

9. The method of claim 1, wherein the weight impressed on the load cell is a partial weight of at least one of:
  the weight of the container plus liquid; and
  the net weight of the liquid inside the container.

10. The method of claim 1, wherein the weight impressed on the load cell is a total weight of at least one of:
  the weight of the container plus liquid; and
  the net weight of the liquid inside the container.

11. A method of dispensing a user-specified volume of liquid from a container coupled to a load cell, configured to generate a signal representing a weight impressed on the load cell by the container and its content, the container being coupled to a pinch valve that is both manually operable and computer operable, the method comprising:

manually opening the pinch valve to dispense a first volume of liquid; and after the first volume of liquid is dispensed, opening the pinch valve by a computer to dispense a second, user-requested volume of liquid, the time that the valve is required to be open to dispense the second volume of liquid being determined after the first volume of liquid is dispensed, by evaluating a polynomial having coefficients, the coefficients of the polynomial operating on a value, which is representative of a signal obtained from the load cell.

12. The method of claim 11, wherein the weight impressed on the load cell by the container is a partial weight of the container and its content.

* * * * *